United States Patent [19]
Wise

[11] Patent Number: 5,523,747
[45] Date of Patent: Jun. 4, 1996

[54] ASSET MANAGEMENT IN A CABLE MANAGEMENT SYSTEM

[75] Inventor: James H. Wise, Palmyra, Pa.

[73] Assignee: The Whitaker Corp., Wilmington, Del.

[21] Appl. No.: 306,082

[22] Filed: Sep. 14, 1994

Related U.S. Application Data

[63] Continuation-in-part of Ser. No. 102,165, Aug. 4, 1993, Pat. No. 5,432,505, which is a continuation-in-part of Ser. No. 58,190, May 3, 1993.

[51] Int. Cl.$^6$ .................................................. G05B 23/02
[52] U.S. Cl. .............................. 340/825.06; 340/825.79; 340/825.54
[58] Field of Search ........................ 340/825.06, 825.08, 340/825.07, 825.79, 825.8, 825.54, 825.17; 361/733, 737, 778, 781, 790, 791, 805; 379/271, 291, 327; 370/53, 60; 455/3.1

[56] References Cited

U.S. PATENT DOCUMENTS

| | | | |
|---|---|---|---|
| 3,978,291 | 8/1976 | Bergeron, Jr. et al. | 179/16 R |
| 5,289,340 | 2/1994 | Yoshifuji | 361/695 |

FOREIGN PATENT DOCUMENTS

| | | |
|---|---|---|
| 0264239 | 4/1988 | European Pat. Off. . |
| 2620890 | 3/1989 | France . |
| 2635426 | 2/1990 | France . |
| 2695279 | 3/1994 | France . |

*Primary Examiner*—Kenneth A. Wieder
*Assistant Examiner*—Edwin C. Holloway, III
*Attorney, Agent, or Firm*—Kevin D. McCarthy

[57] ABSTRACT

A cable management system which provides routing of wired services between service lines (16) and user lines (18). Each service line enters the cable system at a service termination unit circuit card (22) which also holds a portion of a crosspoint switch matrix (126). Each user line enters the system at a line termination unit circuit card (20). The service termination unit circuit cards are all mounted to connectors (36) on a first side of a centerplane board (24) and the line termination unit circuit cards are mounted to connectors (36) on the other side of the centerplane board. Pins (37) extending through the centerplane board interconnect the connectors so that any service line can be connected to any user line. A system controller card (26) mounted to the centerplane board communicates with the circuit cards via a bus (38) on the centerplane board. Each of the peripheral devices connected to the user lines is provided with an identification device (208) which stores a unique identification code and information characterizing the device. The identification devices are connected to otherwise redundant wires within the cable containing the associated user line. The controller card polls all the identification devices to generate a "map" of all the "assets" of the system.

9 Claims, 11 Drawing Sheets

Microfiche Appendix Included
(177 Microfiche, 29 Pages)

ASSET MANAGEMENT IN A CABLE MANAGEMENT SYSTEM

This is a continuation-in-part of prior application Ser. No. 08/102,165, filed Aug. 4, 1993, now U.S. Pat. No. 5,432,505, which is a continuation-in-part of prior application Ser. No. 08/058,190, filed May 3, 1993.

BACKGROUND OF THE INVENTION

A microfiche appendix is attached to the application including 29 pages and 177 microfiche.

This invention relates to a cable management system which provides routing of telephony, low and high speed data, power and video, between service lines and user lines under computer control and, more particularly, to such a system wherein peripheral devices connected to the lines can be identified.

When wiring a commercial building, it is conventional that all of the services carried by wire, such as telephony, low and high speed data, power and video, enter the building for termination at respective patch panels. The patch panels are typically located within wiring closets and include a first array of terminations for the service lines which enter the building and a second array of terminations for the user lines which extend within the building to various user stations. Within each patch panel, the connections between the service lines and the user lines are made manually via jumper wires extending between the first array of terminations and the second array of terminations. In an ideal situation, records would be maintained as to where each wire goes within the building and to what it is connected. However, since the real world is not ideal, such records are not always properly maintained. In addition, wires are often tagged at the patch panels and the tags are lost or become outdated because of lack of updating. Therefore, when a technician is given a service order to add, move or change a connection, the technician must first determine exactly which physical wires are involved. This has proven to be a very time consuming and labor intensive chore. It has been proposed to provide a cable management system with automatic record keeping capability.

The proposed cable management system is interposed between a plurality of service lines and a plurality of user lines and includes a plurality of line termination units mounted on circuit cards which provide connections to the user lines and a plurality of service termination units which are mounted on circuit cards and provide connections to the service lines. Controllable switching means are coupled between the terminations to the user lines and the service lines for selectively providing physical electrical connections between selected ones of the service lines and selected ones of the user lines. A controller is provided to control the switching means to selectively make and open connections between the service lines and the user lines in accordance with received commands, the controller having a memory in which is stored a map of the connections made through the switching means. A management station is provided for issuing commands to the controller, the commands including a connect command to make a physical electrical connection through the switching means between a specified service line and a specified user line, and a disconnect command to open a physical electrical connection through the switching means between one or more specified service lines and one or more specified user lines.

In this cable management system, there is a centerplane board which has a first plurality of card edge connectors on a first side arranged in a first parallel array and a second plurality of card edge connectors on the other side arranged in a second parallel array orthogonal to the first parallel array. The first and second pluralities of card edge connectors are electrically interconnected through the centerplane board. The switching means are mounted on the circuit cards associated with the service termination units and these cards are installed in the card edge connectors on the first side of the centerplane board. The line termination unit circuit cards are installed in the card edge connectors on the other side of the centerplane board. Accordingly, any one or more of the plurality of service lines can be connected to any one or more of the plurality of user lines through the switching means. The controller is mounted on a circuit card and installed in one of the card edge connectors on the first side of the centerplane board. A plurality of conductive bus lines are disposed on the centerplane board and are electrically interconnected to all the card edge connectors on both sides of the centerplane board. A respective transceiver coupled to the bus lines is provided on each of the circuit cards for the controller, the service termination units and the line termination units for effecting communications therebetween over the bus lines.

The cable management system has the capability of generating a map including information as to what type of circuit card is installed in each card edge connector on the centerplane board. Each service termination unit circuit card also has the ability to sense the presence or absence of a line termination unit circuit card in each of the card edge connectors on the other side of the centerplane board so that all connections through the switching means to a particular card edge connector remain open when no line termination unit circuit card is installed in that card edge connector and remains open until a card is installed and there is a command to make a connection to that card.

While the aforedescribed system is capable of generating a map of itself, it would be desirable for the system to be able to construct a map which identifies peripheral devices (assets) connected to all of the lines. With this capability, the system operator can keep track of computers, telephones, etc., connected to the cable management system. It is therefore an object of the present invention to provide an arrangement whereby the peripheral devices connected to each line can be identified.

SUMMARY OF THE INVENTION

The foregoing and additional objects of the present invention are attained in accordance with the principles of this invention in a cable management system interposed between a plurality of service lines and a plurality of user lines and including a plurality of service termination unit circuit cards each connectable to a first predetermined number of respective ones of the plurality of service lines, a plurality of line termination unit circuit cards each connectable to a second predetermined number of respective ones of the plurality of user lines, and connecting means for connecting each of the plurality of service termination unit circuit cards to all of the plurality of line termination unit circuit cards. Each of the line termination unit circuit cards includes a respective port connector for each of the user lines connected to that line termination unit circuit card and a respective user line circuit path between each of the port connectors and the connecting means and each of the plurality of service termination unit circuit cards includes switching means for selectively connecting one of the plurality of service lines connected to that service termination unit circuit card to one of the plurality of user line circuit paths. Each of the user lines consists of a first plurality of wires within a cable having the first plurality of wires and a second plurality of wires, and each of the port connectors is connected to the first and second pluralities of wires of the cable carrying the respective user line associated with that port connector. According to this invention, there is provided an arrangement for identifying a peripheral device connected to each user line via the respective cable. The inventive arrangement comprises an identification device associated with the peripheral device, the identification device including ID code means for providing a unique identification code for the identification device, coupling means for coupling the ID code means to the second plurality of wires of the cable, and control means responsive to an interrogation signal on the second plurality of wires of the cable for causing the coupling means to transmit the unique identification code from the ID code means over the second plurality of wires of the cable. The arrangement further comprises interrogation means coupled to the second plurality of wires of the cable through the respective port connector for placing the interrogation signal on the second plurality of wires of the cable and thereafter receiving the unique identification code from the identification device.

In accordance with an aspect of this invention, the interrogation means includes bus means on each of the line termination unit circuit cards, and controllable switch means on each of the line termination unit circuit cards coupled between the bus means on each card and the second plurality of wires at each of the port connectors on each card.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
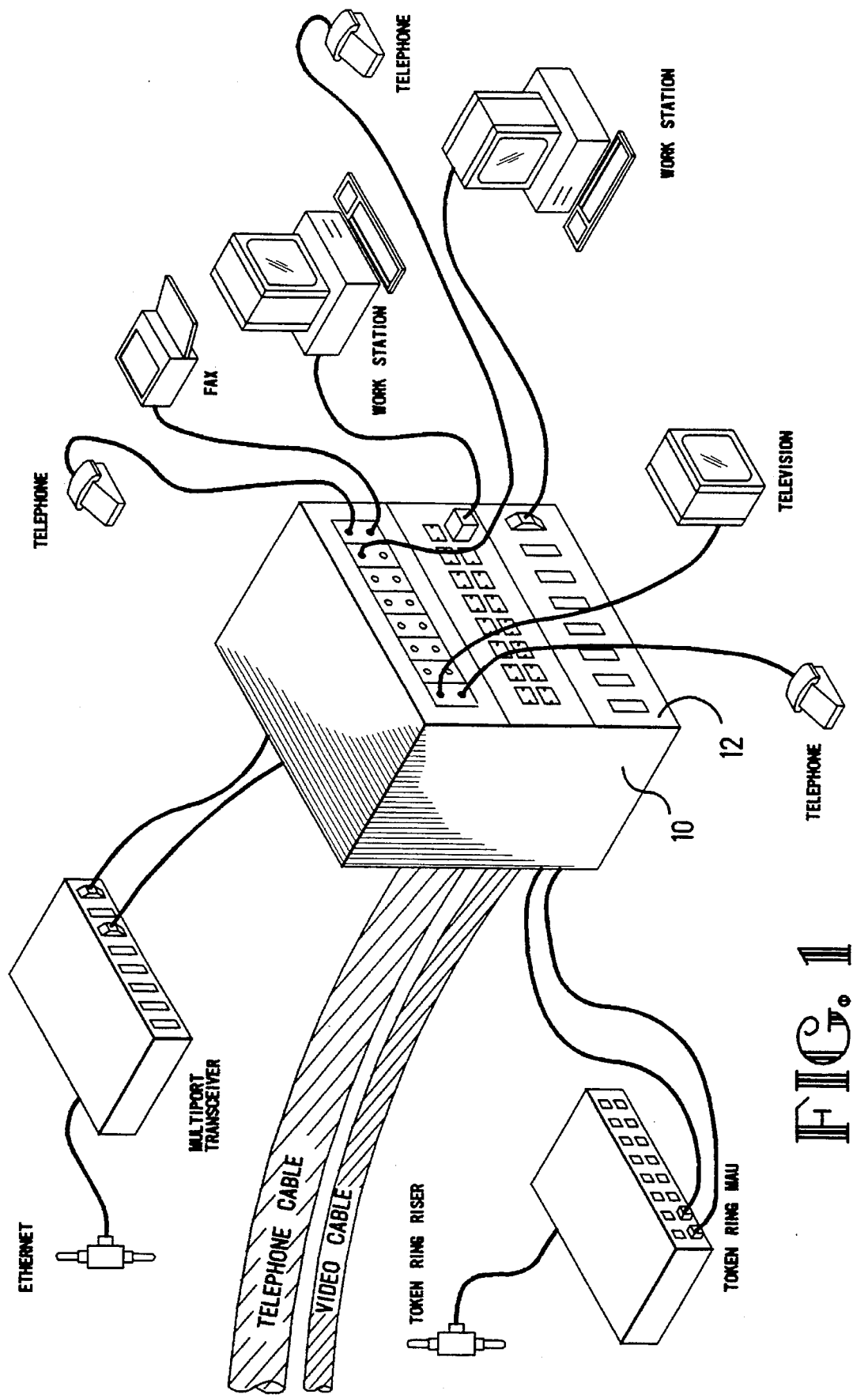
FIG. 1 is a conceptual drawing showing the proposed cable management system discussed above.

As shown in FIG. 1, the cable management system with which the present invention is concerned is contained within an enclosure 10 illustrated as having media-specific connectors on both its front surface 12 and its rear surface (not shown). The cable management system within the enclosure 10 serves as a flexible electronic patching, or cross-connecting, hub for automated cable management of communications circuits. Various services, such as LAN'S, telephone, computer I/O channels and peripherals, and video distribution links are connected to the cable management system through media-specific connectors on the rear surface of the enclosure 10. Typically, these will be aggregated multi-pair cables or high bandwidth cables, such as coax and fiber, common in riser and horizontal distribution subsystems. As shown in FIG. 1, such services include ethernet, telephone, video and token ring.

Matrix switch modules are installed within the enclosure 10. Media-specific connectors corresponding to the media selected for each user's work station subsystem wiring are installed on the front surface 12 and have cables which are attached and then run to the user's location. Thus, as shown in FIG. 1, at the user's location there may be one or more peripheral user devices, such as telephones, computer work stations, facsimile machines, or television sets. Once wired in this fashion, each user can be electronically connected to any combination of services that is required. All future changes in each user's service complement can be accomplished electronically.

Figure 2:
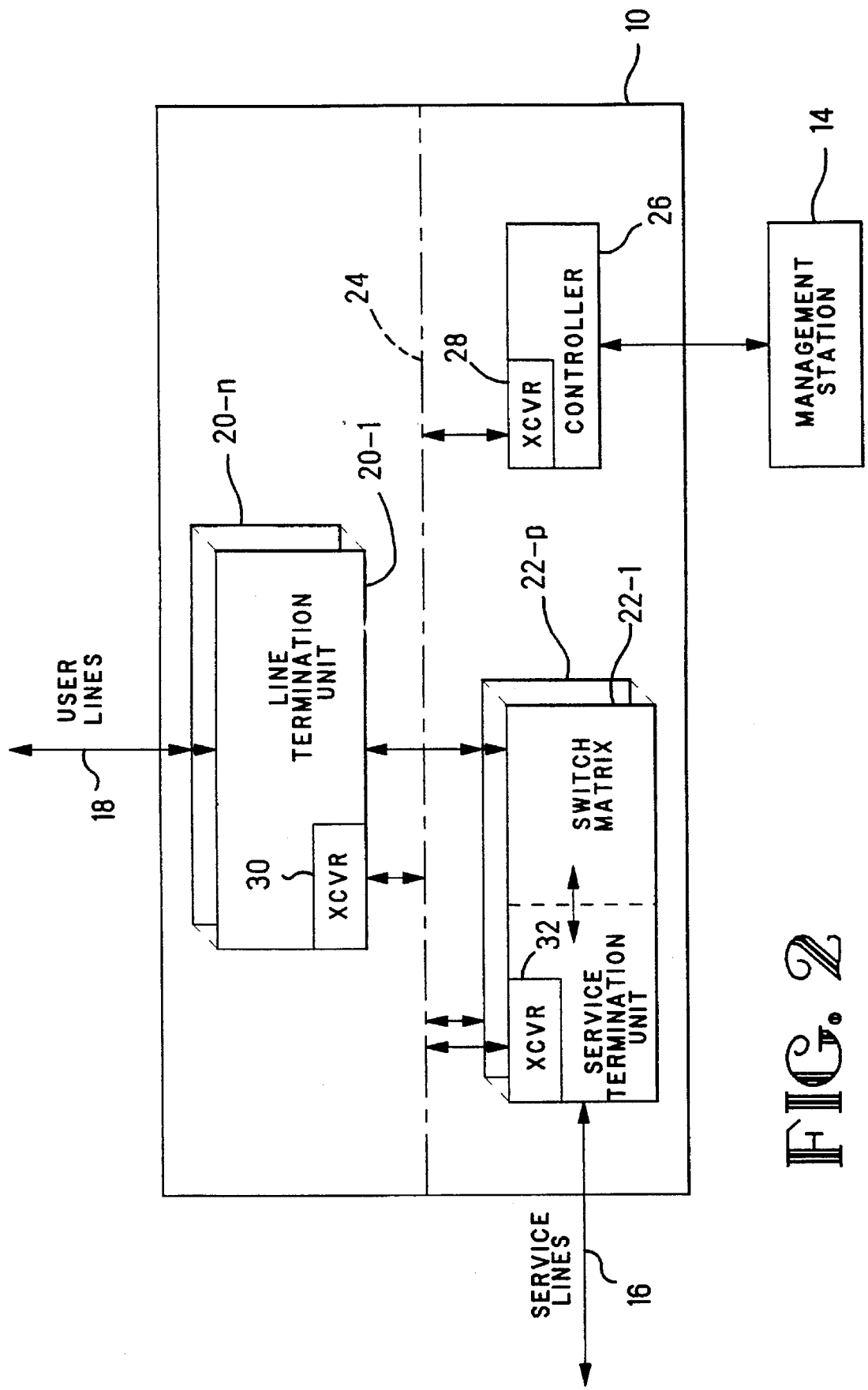
FIG. 2 is a block diagram of the cable management system of FIG. 1.

The cable management system within the enclosure 10 maintains a data base of the location, source and destination for each cable. The system can be configured by a management station 14 (FIG. 2). As shown in FIG. 2, the cable management system contained within the enclosure 10 is connected to the service lines 16, which may be telephone lines, video lines, etc., which come to the system from the various service providers. The cable management system is also connected to the user lines 18 which extend to various user locations. The user lines 18 are each connected to a respective port on one of a plurality of line termination unit circuit cards 20-1, ..., 20-n. Similarly, the service lines 16 are each connected to a respective port on one of a plurality of service termination unit circuit cards 22-1, ..., 22-p.

The switching matrix for connecting the service lines 16 to the user lines 18 is distributed among the service termination unit circuit cards 22-1, ..., 22-p so that each of the service termination unit circuit cards 22-1, ..., 22-p includes thereon a plurality of service termination units for connection to a group of the service lines 16 and a portion of the overall switch matrix. The line termination unit circuit cards 20-1, ..., 20-n and the service termination unit circuit cards 22-1, ..., 22-p are installed on opposite sides of a centerplane board 24, represented schematically in FIG. 2 by a dot-dash line, in such a manner that every line termination unit circuit card 20-1, ..., 20-n is connected to the switch matrix portion of every service termination unit circuit card 22-1, ..., 22-p, as will be described in full detail hereinafter.

Within the enclosure 10, there is also provided a controller circuit card 26 which is mounted to the centerplane board 24 on the same side thereof as the service termination unit circuit cards 22-1, . . . ,22-p. The controller circuit card 26 is connected to the management station 14 in a suitable manner, such as through an RS-232 link or a modem. To effect communications between the controller circuit card 26, the line termination unit circuit cards 20-1, . . . , 20-n, and the service termination unit circuit cards 22-1, . . . , 22-p, a multi-line communications bus 38 (FIG. 3C) is provided on the centerplane board 24. Each of the controller circuit card 26, the line termination unit circuit cards 20-1, . . . , 20-n, and the service termination unit circuit cards 22-1, . . ., 22-p, is provided with a respective transceiver 28, 30 and 32 which is coupled to the communications bus 38 when the respective circuit card is mounted to the centerplane board 24.

Each of the service termination unit circuit cards 22-1, . . ., 22-p includes a memory which contains a map of all the connections through the switch matrix portion on the respective service termination unit circuit card, and the controller circuit card 26 includes a memory which contains a map of all of the connections in the entire cable management system within the enclosure 10. The management station 14 issues commands to the circuitry on the controller circuit card 26. These commands include a connect command to make a connection between one or more specified service lines 16 and one or more specified user lines 18, and a disconnect command to open a connection between a specified one of the service lines 16 and a specified one of the user lines 18. The circuitry on the controller circuit card 26 places each appropriate command onto the communications bus 38 on the centerplane board 24, from which it is received by the transceiver 32 on the specified one of the service termination unit circuit cards 22-1, . . . , 22-p, which then controls its respective switch matrix portion in accordance with the received command to either make or open the specified connection.

Figure 3A:
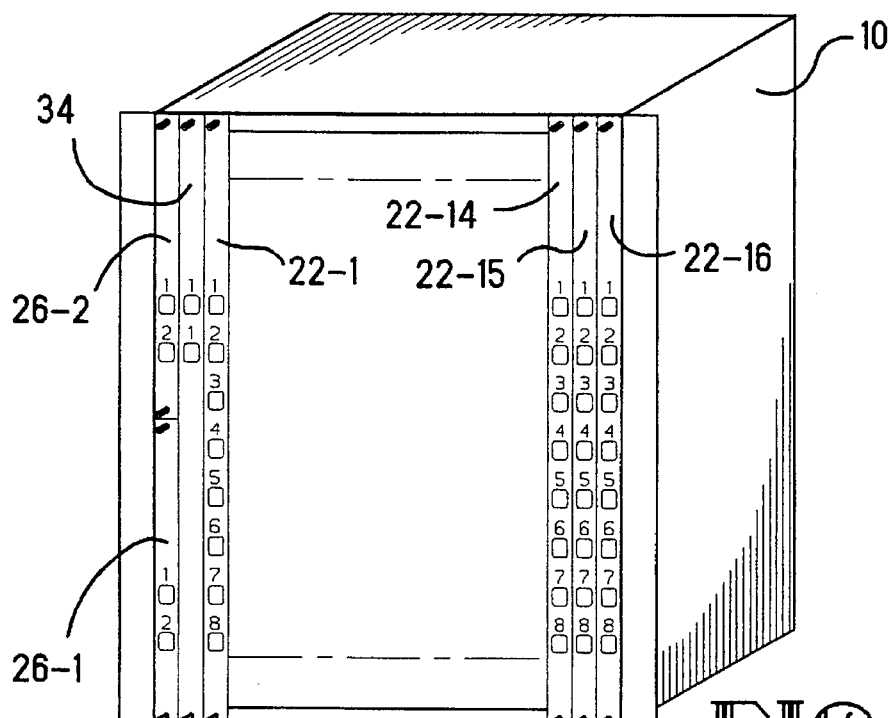
FIG. 3A schematically depicts the rear of the interior of the cable management system enclosure showing the service termination unit circuit cards and the controller cards.
Figure 3B:
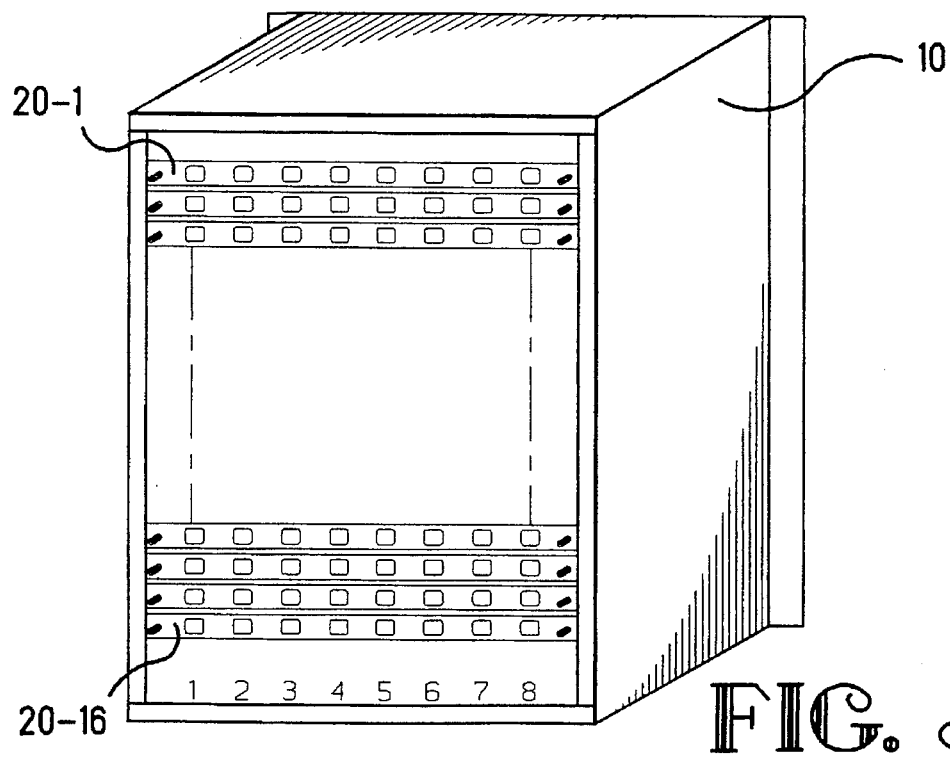
FIG. 3B schematically depicts the front of the interior of the cable management system enclosure showing the line termination unit circuit cards.

As shown in FIG. 3A, there are illustratively sixteen service termination unit circuit cards 22-1, . . . , 2-16 which are installed vertically in the enclosure 10 from the rear thereof. In addition, the controller circuit card 26, which is comprised of two half-cards 26-1 and 26-2, are also installed vertically, as is an additional controller circuit card 34, which plays no part in the present invention. As shown in FIG. 3B, there are illustratively sixteen line termination unit circuit cards 20-1, . . . , 20-16 which are installed horizontally in the enclosure 10 from the front thereof. Each of the line termination unit cards 20-1, . . . , 20-16 and the service termination unit circuit cards 22-1, . . . , 22-16 has eight ports terminated by a respective mediaspecific connector on the visible edge of the circuit card.

Figure 3C:
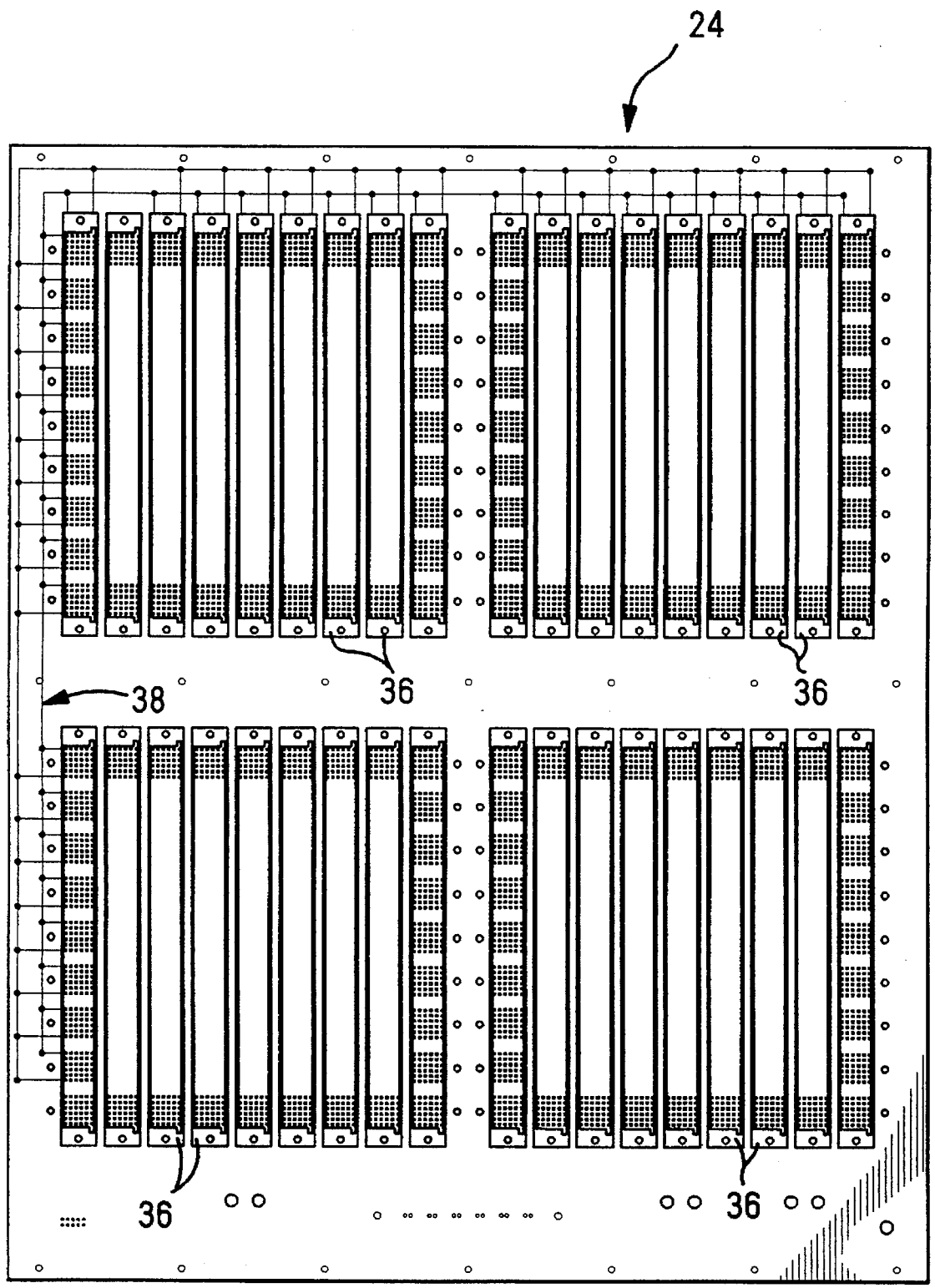
FIG. 3C shows a first side of the centerplane board, which side is adapted to mount the service termination unit circuit cards and the controller cards.
Figure 3D:
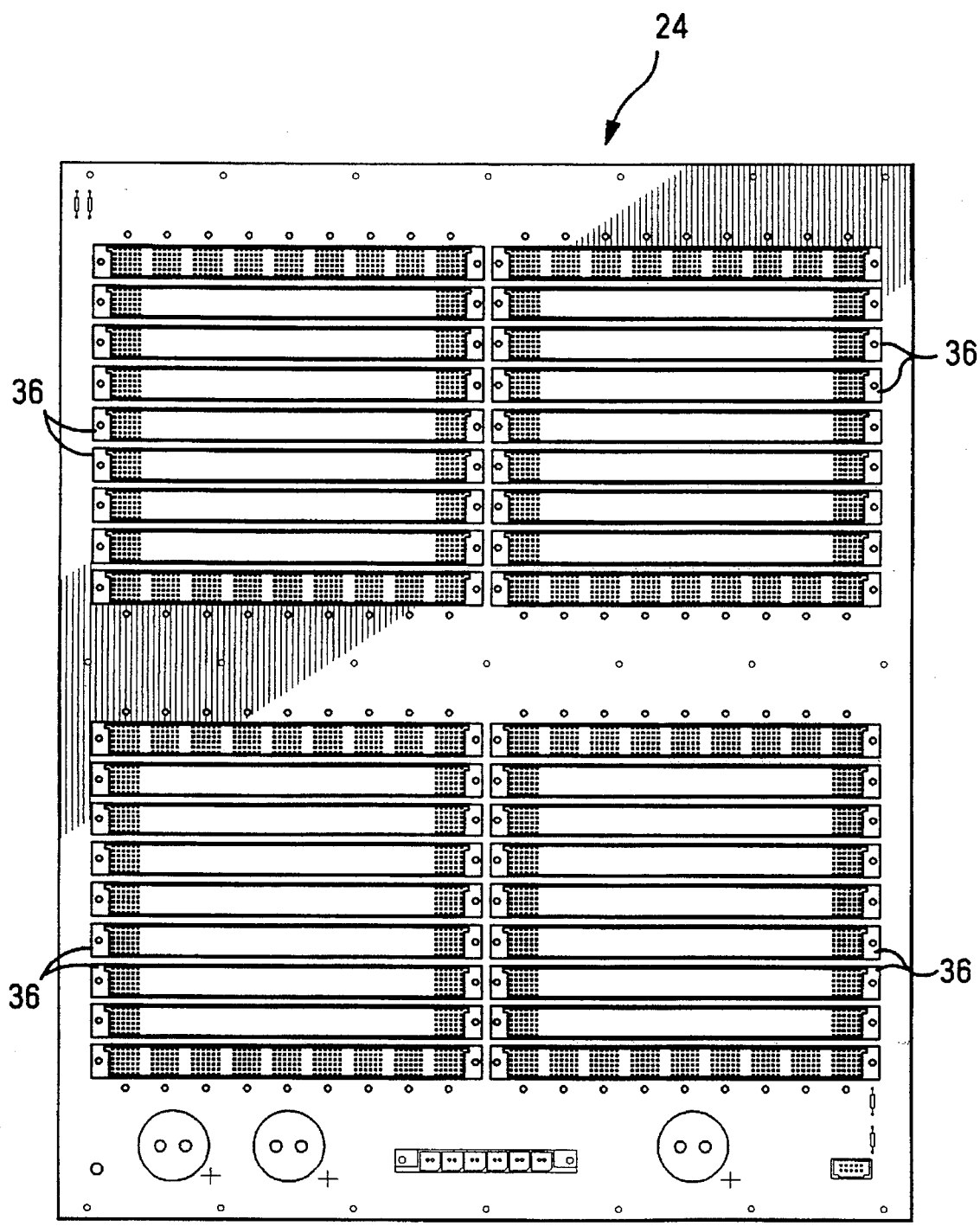
FIG. 3D shows the other side of the centerplane board, which side is adapted to mount the line termination unit circuit cards.

FIGS. 3C and 3D illustrate opposite sides of the centerplane board 24. Specifically, FIG. 3C shows the side of the centerplane board 24 on which the service termination unit circuit cards and the controller circuit cards are mounted and FIG. 3D shows the side of the centerplane board 24 on which the line termination unit circuit cards are mounted. Thus, as shown in FIG. 3C, for each of the service termination unit circuit cards and the controller circuit cards there is provided a pair of vertically oriented card edge connectors 36. Likewise, as shown in FIG. 3D, on the other side of the centerplane board 24 there is provided for each of the line termination unit circuit cards a pair of horizontally oriented card edge connectors 36. (The top and bottom rows of connectors 36 are not utilized.) Each of the card edge connectors 36 has within it nine fields, each of which includes thirty six pins 37 (FIG. 3E) arranged in a 6×6 square matrix. The pins 37 extend through the centerplane board 24 to a corresponding field in one of the card edge connectors 36 on the other side of the board 24, thereby interconnecting the connectors 36 on both sides of the board 24.

Illustratively, each of the service termination unit circuit cards 22-1, . . . , 22-16 and the line termination unit circuit cards 20-1, . . . , 20-16 has eight input/output ports. Each of these ports is a four wire port and each of the four wires of each port of the line termination unit circuit cards is connected to each of sixteen of the pin fields in the pair of connectors 36 to which its card is connected. This accounts for 8×4= 32 of the thirty six pins of each field. The remaining four pins in each of those sixteen pin fields are reserved for power, ground and control signals. Similarly, each of the four wires of a service termination unit circuit card port is connected to the switch matrix portion on that service termination unit circuit card. The outputs of each service termination unit circuit card's switch matrix portion are eight 4-wire bundles which are each connected to four pins of each of sixteen of the pin fields of the connector 36 associated with that service termination unit circuit card. Again, that accounts for thirty two of the thirty six pins in each of those sixteen pin fields, with the remaining four pins being reserved for power, ground and control signals.

Figure 3E:
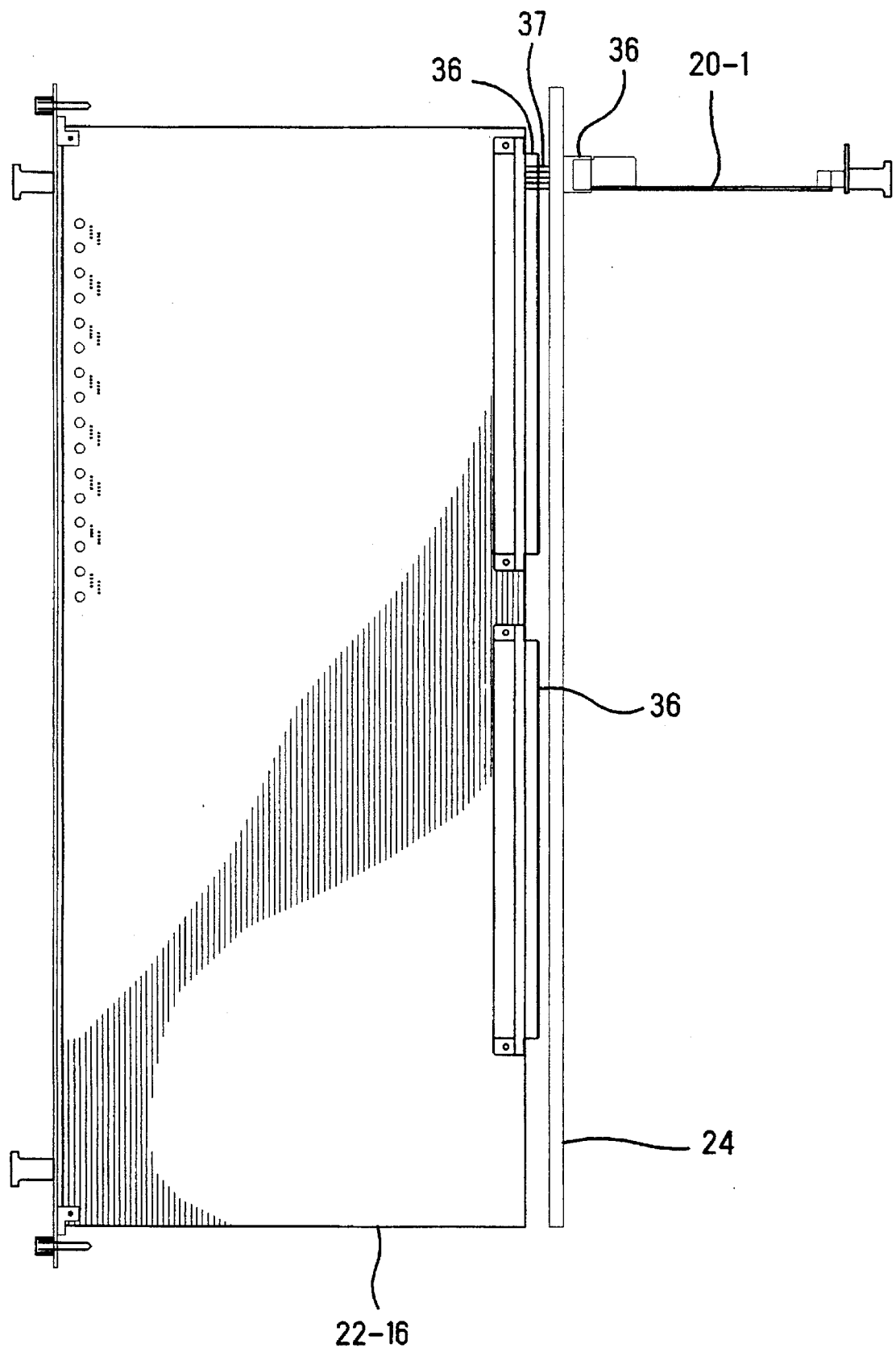
FIG. 3E schematically illustrates orthogonal edge connections of a service termination unit circuit card and a line termination unit circuit card to the centerplane board.

Because of the orthogonal relationship of the connectors 36 on both sides of the centerplane board 24, every port of a line termination unit circuit card is connected to a pin field connected to every one of the service termination unit circuit cards on the other side of the centerplane board 24. Thus, FIG. 3E illustrates how the line termination unit circuit card 20-1 is connected to a pin field of the service termination unit circuit card 22-16, as well as to all corresponding pin fields of all the other fifteen service termination unit circuit cards. As shown in FIG. 3E, the pins 37 (a 6×6 array) connect the card edge connectors 36 on the two sides of the centerplane board 24 at their intersection (i.e., at their common pin fields). Illustratively, the line termination unit circuit cards 20-1, . . . , 20-16 take up the second through the seventeenth rows of the horizontal connectors 36 on their side of the centerplane board 24. The top and bottom rows are vacant. Similarly, the service termination unit circuit cards 22-1, . . . , 22-16 take up the third through the eighteenth columns of the vertical connectors 36 on their side of the board 24. Thus, through the switch matrices on the service termination unit circuit cards, any one of the service lines 16 can be connected to any one of the user lines 18. In the illustrative embodiment, there are sixteen service termination unit circuit cards, each with eight ports, for a total of 128 service ports and there are sixteen line termination unit circuit cards, each having eight ports, for a total of 128 user ports. Each switch matrix portion on a service termination unit circuit card is an eight port by 128 port (32 by 512 lines) matrix of crosspoints. Thus, as disclosed, each of the 128 service lines can be connected to each of the 128 user ports.

As shown schematically in FIG. 3C, there is a multi-wire communications bus 38 on the centerplane board 24. The bus 38 extends parallel to the leftmost column of the vertical connectors 36 and parallel to the upper row of the horizontal connectors 36 (not shown in FIG. 3C) on the other side of the board 24. In order that the transceivers 28, 30 and 32 may be interconnected, the bus 38 is terminated at the pin fields in the second through seventeenth rows of the leftmost column for connection to the transceivers 30 on all of the line termination unit circuit cards 20-1, . . . , 20-16; at the upper pin fields in the third through eighteenth columns for connection to the transceivers 32 on all of the service termination unit circuit cards 22-1, ..., 22-16; and at the upper pin field of the first column for connection to the transceiver 28 of the controller circuit card 26.

Figure 4:
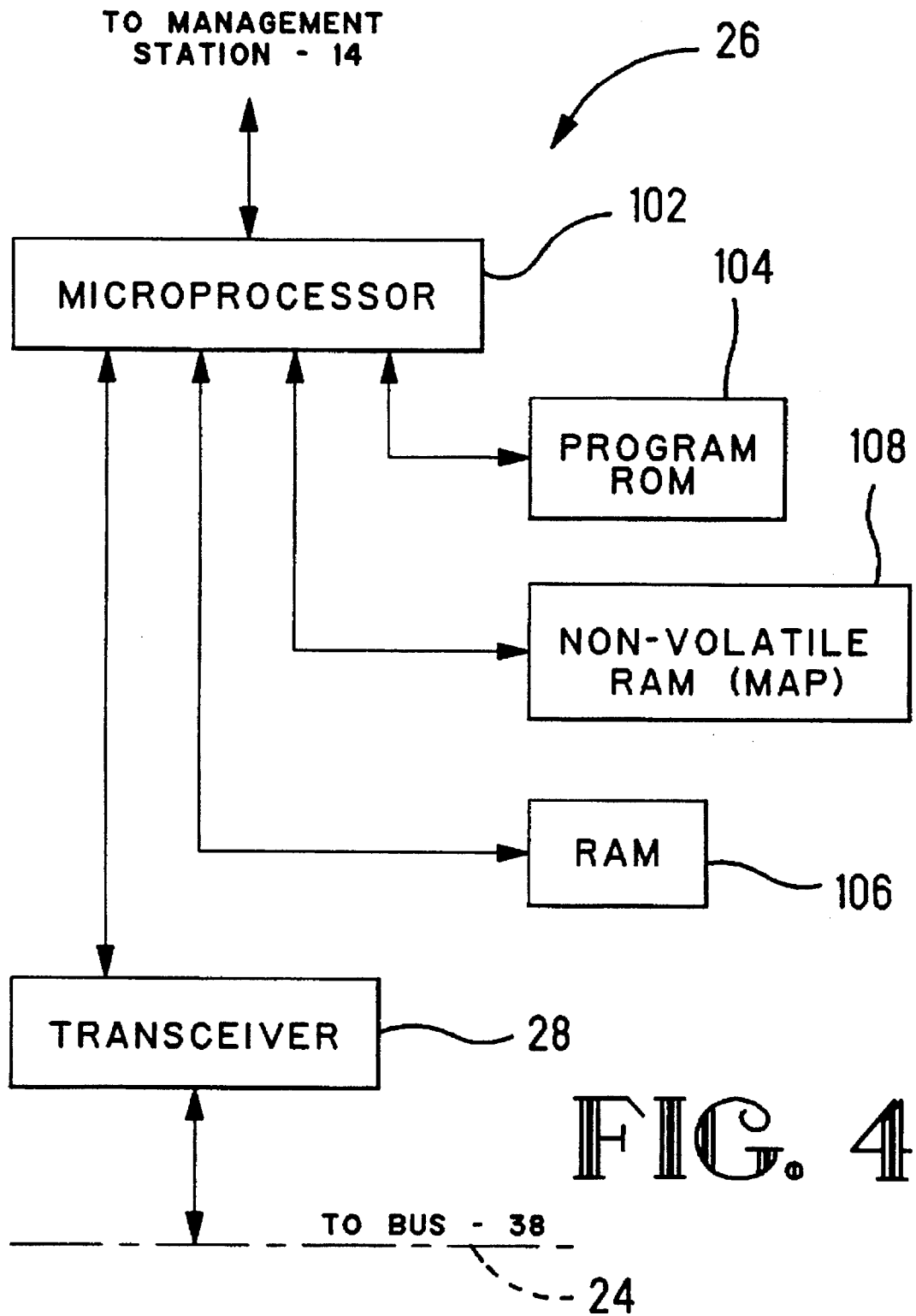
FIG. 4 is a block diagram of an illustrative controller for the cable management system of FIG. 2.

FIG. 4 illustrates circuitry on the controller circuit card 26 which may be utilized in the cable management system according to this invention. The controller 26 includes a microprocessor 102 which is associated with three different types of memory. The first type of memory is a program read only memory (ROM) 104 which has stored therein the program instructions for operating the microprocessor 102. The microprocessor 102 is also associated with a random access memory (RAM) 106 which is utilized as a temporary storage memory by the microprocessor 102. Lastly, there is a non-volatile random access memory 108 which is utilized to store a map showing all of the connections through the switch matrix portions on the service termination unit circuit cards 22-1, ..., 22-p as well as information as to what type of card is installed in each of the connectors 36. The non-volatile RAM 108 may be an electrically erasable PROM or a "flash" PROM which saves its contents even when power is lost. Since it takes a relatively long time to write information into the non-volatile RAM 108, the RAM 106 is used to temporarily store the map until such time as it is written into the non-volatile RAM 108.

The microprocessor 102 is coupled to the management station 14 in any suitable manner, such as by an RS-232 link or a modem, or through a local area network. The microprocessor 102 receives commands from the management station 14, such as a connect command or a disconnect command as described above, and in accordance with the program stored in the ROM 104 transmits instructions over the bus lines 38 on the centerplane board 24 via the transceiver 28. Illustratively, the transceiver 28 is a Neuron® chip manufactured by Echelon Corp. The microprocessor 102 addresses a specified one of the service termination unit circuit cards 22-1, ..., 22-p over the bus 38 via the transceiver 28 and provides an appropriate instruction for controlling the switch matrix portion of that service termination unit circuit card. The microprocessor 102 receives acknowledgements of its instructions, which are returned over the bus 38 from the specified service termination unit circuit card, via the transceiver 28, and updates the map stored in the non-volatile RAM 108.

Figure 5:
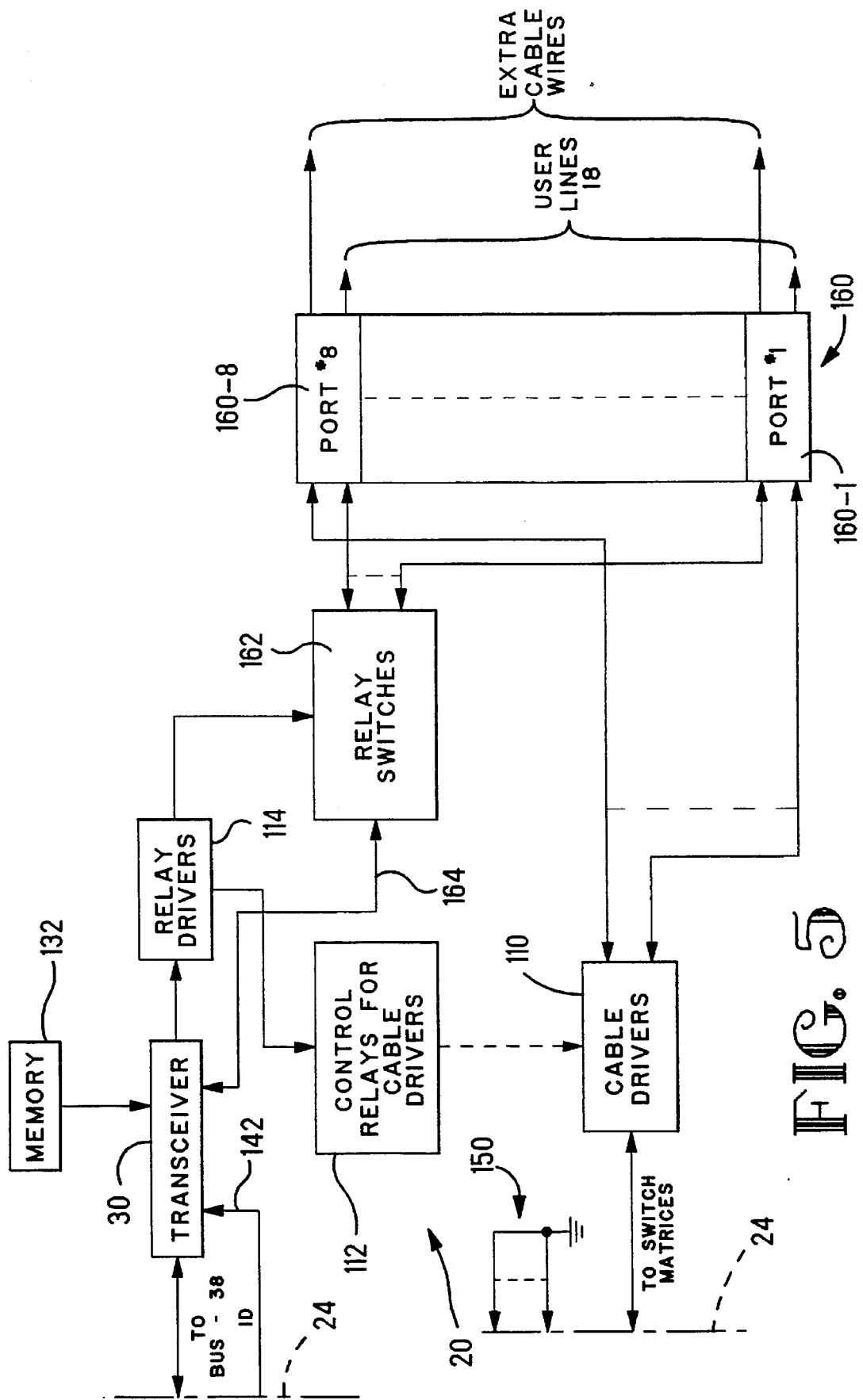
FIG. 5 is a block diagram showing the circuitry on an illustrative line termination unit circuit card for the cable management system of FIG. 2.

The line termination unit circuit card 20 illustrated in FIG. 5 includes the transceiver 30 coupled to the bus lines 38 on the centerplane board 24. Illustratively, the transceiver 30 is a Neuron® chip manufactured by Echelon Corp. The function of the line termination unit circuit card 20 is to provide interfaces between the user lines 18 and the switch matrices on the service termination unit circuit cards 22-1, ..., 22-p mounted on the other side of the centerplane board 24. This interfacing takes place via user line circuit paths which include the cable drivers (amplifiers) 110. The cable drivers 110 are selectively controllable to pass signals either from individual ones of the service lines 16 to individual ones of the user lines 18 or in the reverse direction from individual ones of the user lines 18 to individual ones of the service lines 16, as determined by the settings of respective ones of the control relays 112. The control relays 112 are controlled by the relay drivers 114 which are operated on the basis of instructions received via the transceiver 30 from the microprocessor 102 of the controller 26 over the bus lines 38 on the centerplane board 24. Initially, all the cable drivers 110 are set to pass signals in the direction from the user lines 18 to the service lines 16, with the cable drivers being bypassed. This is for safety reasons so that upon system start-up dangerously high amplified signals are not inadvertently transmitted to the user lines 18, where they could damage sensitive equipment.

Figure 6:
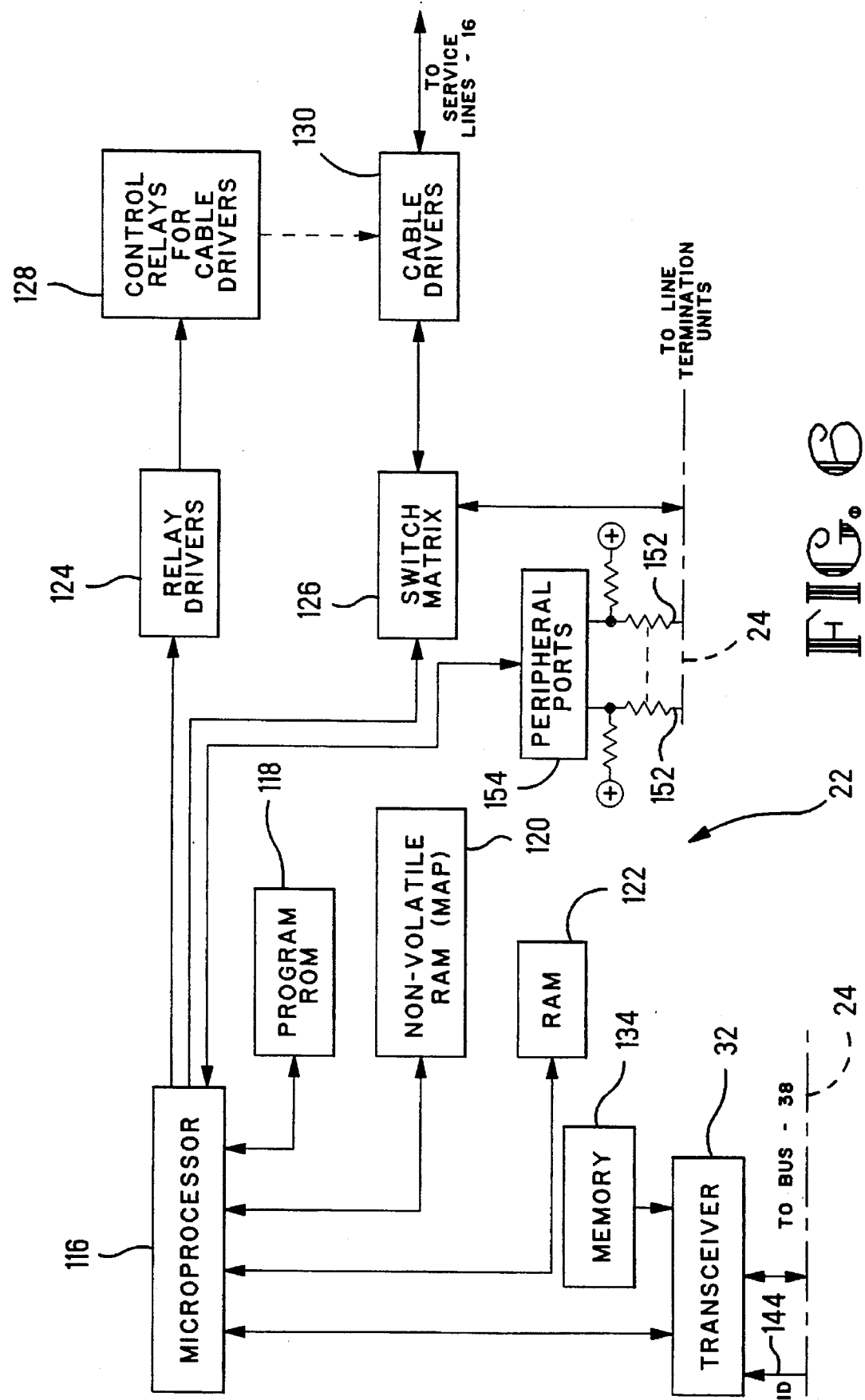
FIG. 6 is a block diagram showing the circuitry on an illustrative service termination unit circuit card for the cable management system of FIG. 2.

FIG. 6 illustrates the circuitry 22 on one of the service termination unit circuit cards 22-1, ..., 22-p. This circuitry includes a microprocessor 116 having associated therewith three types of memory. There is a program ROM 118, a non-volatile RAM 120 and a RAM 122. These memories function similarly to the memories 104, 108 and 106, respectively, associated with the microprocessor 102 of the controller 26, but are specifically for the particular one of the service termination unit circuit cards 22-1, ..., 22-p with which they are associated. The microprocessor 116 is coupled to the transceiver 32, which is illustratively a Neuron® chip manufactured by Echelon Corp. The transceiver 32 is coupled to the bus lines 38 on the centerplane board 24 and is utilized for communications between the microprocessor 116 and the microprocessor 102 on the controller circuit card 26. Instructions received by the microprocessor 116 via the transceiver 32 over the bus 38 from the microprocessor 102 are utilized to control the relay drivers 124 and the switch matrix 126. Interfacing between the service lines 16 and the switch matrix 126 is effected via service line circuit paths which include the cable drivers (amplifiers) 130. The relay drivers 124 set the control relays 128 so that the cable drivers 130 interposed between the service lines 16 and the switch matrix 126 are "pointing" in the proper directions. Again, as with the cable drivers 110 associated with the line termination unit circuit cards 20-1, ..., 20-n, the cable drivers 130 are initially bypassed. The switch matrix 126 is connected to all of the line termination unit circuit cards 20-1, ..., 20-n mounted on the other side of the centerplane board 24, as previously described, so that any one of the service lines 16 entering that particular service termination unit card may be connected to any one of the user lines 18. In accordance with instructions received from the microprocessor 102 on the controller circuit card 26, the microprocessor 116 controls the switch matrix 126 to make an appropriate physical electrical connection therethrough between a specified one of the service lines 16 entering that card and a specified one of the user lines 18 entering any one of the line termination unit circuit cards 20-1, ..., 20-n on the other side of the centerplane board 24.

Figure 3F:
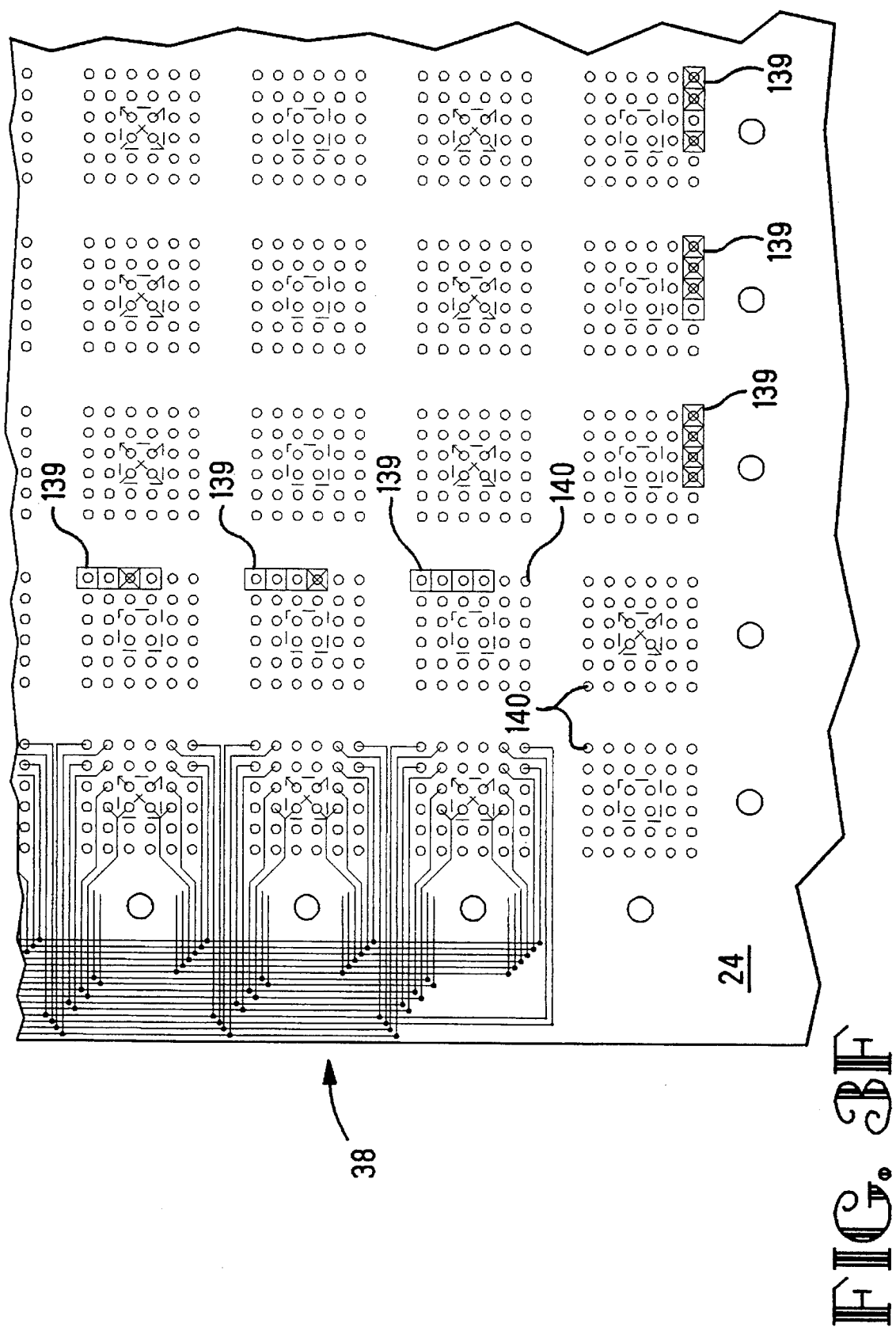
FIG. 3F is an enlarged detail of a portion of the first side of the centerplane board showing card connector identification code conductive areas and part of the communications bus.

In order that the controller 26 can make appropriate connections between service termination unit circuit cards and line termination unit circuit cards, each of these circuit cards includes a respective memory chip, illustratively an EPROM, which contains unique "as built" information for that card. Such information includes the type of ports on that card, the configuration of the ports, etc. This memory is loaded at the time the circuit card is manufactured, or at least prior to the circuit card being installed in the cable management system. Thus, as shown in FIG. 5, each line termination unit circuit card 20 includes an "as built" memory 132 coupled to the transceiver 30 and, as shown in FIG. 6, each service termination unit circuit card 22 includes an "as built" memory 134 coupled to the transceiver 32. Further, in order that the controller 26 can identify the connector in which a particular one of the service termination unit circuit cards or the line termination unit circuit cards is mounted, an arrangement is provided wherein a unique identification code is assigned to each of the connectors on each side of the centerplane board 24. FIG. 3F illustrates how such identification code assignment is effected.

FIG. 3F illustrates, on an enlarged scale, a portion of the centerplane board 24. Preferably, the board 24 is a multilayer printed circuit board with an array of 6×6 matrices of apertures 140 which correspond to the pin fields interconnecting the connectors 36 on the two sides of the board 24. A pattern of conductive material corresponding to the identification code for each of the connectors 36 is provided on the board 24 in a predetermined area associated with each of the connectors 36. Specifically, the pattern of conductive material extends into selected ones of the apertures 140 to contact the pin extending through that aperture. Preferably, the conductive areas 139 are all connected to a ground level trace on one of the layers of the board 24, so that a pattern of ground signals is applied to selected pins of each of the connectors 36, which pattern of ground signals is received by the particular service termination unit circuit card or line termination unit circuit card mounted to that connector. A binary code is utilized for the identification code. Since each side of the centerplane board 24 can hold up to sixteen service termination unit circuit cards or up to sixteen line termination unit circuit cards, the identification codes for each side of the board 24 are each comprised of four bits ($2^4$=16). As shown in FIG. 3F, since the service termination unit circuit cards are mounted vertically on one side of the board, the identification code illustratively is provided in the bottom pin field of each of the sixteen columns of pin fields in which a service termination unit circuit card may be installed. Thus, starting in the third column from the left, the four rightmost apertures of the bottom row of the bottom pin field are utilized for the identification codes. As shown, each of those four apertures either has a conductive area extending therein for contact with a respective pin (as indicated by an X-ed square surrounding that aperture) to ground that pin, or the conductive area does not extend into that aperture (as indicated by an open square surrounding that aperture) to allow that pin to electrically float. The grounding of a pin corresponds to a binary ZERO and the electrical floating of a pin corresponds to a binary ONE. Thus, the service termination unit circuit card mounted in the third column from the left (i.e., service termination unit circuit card number 1) has the binary identification code 0000; the service termination unit circuit card mounted in the fourth column from the left has the binary identification code 0001; the service termination unit circuit card mounted in the fifth column from the left has the binary identification code 0010; etc., it being noted that the most significant bit of each binary identification code is on the right, as viewed in FIG. 3F, but is on the left in the above text. Similarly, the identification codes for the horizontally mounted line termination unit circuit cards illustratively are provided in the second through seventeenth rows of the second column of pin fields. The binary coding scheme for the horizontal line termination unit circuit cards is the same as for the vertical service termination unit circuit cards.

The aforedescribed binary identification codes are permanently established and associated with specific ones of the connectors 36. Thus, the binary identification codes identify the physical locations of installed service termination unit circuit cards and line termination unit circuit cards so that if a service termination unit circuit card is moved from one of the connectors 36 to another of the connectors 36, its binary identification code will change. As shown in FIG. 5, for each of the line termination unit circuit cards 20, the binary identification code is provided over the leads 142 from the centerplane board 24 to the transceiver 30. Similarly, as shown in FIG. 6, for each of the service termination unit circuit cards 22, the binary identification code is provided over the leads 144 from the centerplane board 24 to the transceiver 32.

In addition to the binary identification codes and the "as built" information stored in the memories on the circuit cards, as discussed above, each of the Neuron® chips making up the transceivers 28, 30, 32 is provided, upon its manufacture, with a burned in random identification number. Upon the initial application of power to the system 10, and alternatively upon receiving a "map" command from the management station 14, the controller 26 polls all of the line termination unit circuit cards 20-1, . . . , 20-n and all of the service termination unit circuit cards 22-1, . . . , 22-p over the bus 38. When polled, each of the line termination unit circuit cards and service termination unit circuit cards provides on the bus 38 its binary identification code received on the respective lines 142, 144, its "as built" information from its respective memory 132, 134, and the identification number of its Neuron® chip. In this way, the controller 26 can generate a "map" of all of the "assets" within the enclosure 10.

For safety reasons, it is desirable that, in the event of removal of one of the line termination unit circuit cards 20-1, . . ., 20-n from a connector, all of the service termination unit circuit cards 22-1, . . . , 22-p open all of the connections through the respective switch matrix 126 to that connector, immediately upon sensing such removal and without waiting for an instruction from the controller 26. Toward that end, each line termination unit circuit card 20 provides a predetermined voltage, illustratively ground level, over the leads 150 to a predetermined pin member in each of the pin fields associated with each of the service termination unit circuit card connectors on the other side of the centerplane board 24. Thus, in accordance with the illustrative embodiment, there are sixteen leads 150 each associated with a respective pin field in the third through eighteenth vertical connector columns on the centerplane board 24. Each of the service termination unit circuit cards monitors the voltage on those pin members for all of the line termination unit circuit card connectors. As shown in FIG. 6, these voltages are applied to the leads 152 which are coupled to the peripheral ports circuit 154 through respective pull-up networks. The peripheral ports circuit 154 is coupled to the microprocessor 116. Thus, when a line termination unit circuit card is present in its connector 36, the particular one of the leads 152 associated with that connector is at ground level, which is interpreted by the microprocessor 116 as a binary ZERO. On the other hand, if there is no line termination unit circuit card installed in that connector, that particular one of the leads 152 is floating and the input to the peripheral ports circuit 154 is at a positive voltage level, which is interpreted by the microprocessor 116 as a binary ONE. At regular intervals, the microprocessor 116 scans the peripheral ports circuit 154 and receives therefrom a sixteen bit word, each bit corresponding to a respective one of the horizontal connectors 36 on the other side of the centerplane board 24. If all of the connectors have line termination unit circuit cards installed therein, this sixteen bit word will be all binary ZEROS. The microprocessor 116 compares the present sixteen bit word with the previous sixteen bit word to determine whether a line termination unit circuit card has been removed since the last scan. If such removal is detected, the microprocessor 116 searches through the map stored in the RAM 120 to determine the connections that had been made to that card through the switch matrix 126. Those connections are then opened.

Figure 7:
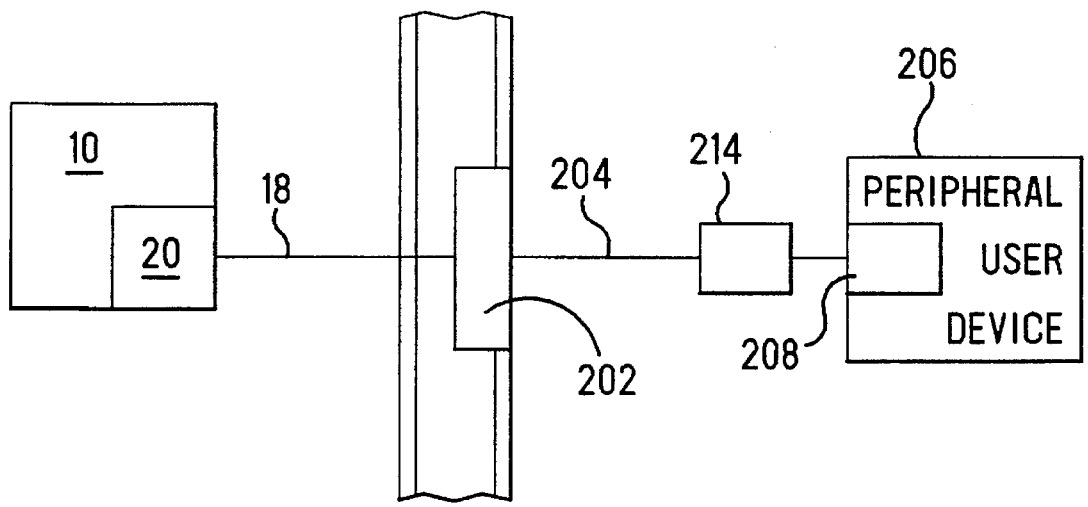
FIG. 7 is a block diagram illustrating peripheral devices which can be identified according to this invention.

The foregoing description was directed to the generation of a map of all of the assets within the enclosure 10. The system operator often needs to keep track of all the peripheral devices, or assets, connected to the user lines 18. These peripheral devices include wall outlets directly connected to the user lines 18 for providing removable connections to the user lines, peripheral user devices such as telephones, computer work stations, facsimile machines, etc., and drop cables connected between the peripheral user devices and the wall outlets. Thus, as shown in FIG. 7, a wall outlet 202 is directly connected to a user line 18. As is conventional, the wall outlet 202 includes a socket (not shown) by means of which the drop cable 204 is removably connected to the user line 18. The drop cable 204 is used for coupling the peripheral user device 206 to the user line 18. According to the invention, the wall outlet 202, the drop cable 204 and the peripheral user device 206 can all be identified so that the controller 26 can generate a map showing all the peripheral devices connected to each of the user lines 18.

Standard practice when wiring a commercial building for communications utilizes insulated cable which typically includes eight wires (e.g., four sets of unshielded twisted pair). With present day technology, each of the user lines 18 uses at most four of the eight wires for communication. The remaining four wires are redundant. The present invention takes advantage of these additional wires for use in identifying the peripheral devices.

Figure 8:
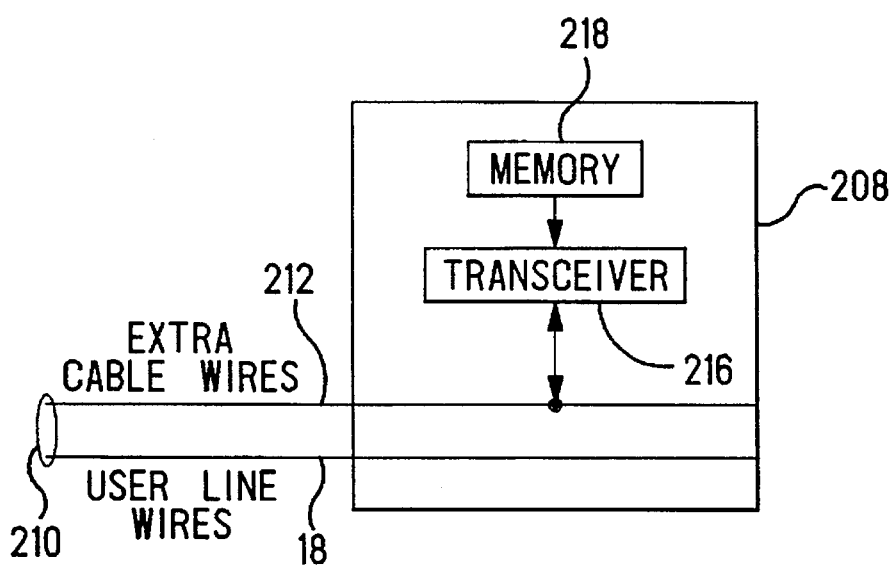
FIG. 8 is a block diagram of an illustrative peripheral device identifying arrangement according to this invention.

As shown in FIG. 8, each of the peripheral devices is provided with an identification arrangement (or device) 208. The identification arrangement 208 is connected to the cable 210 which includes the user line wires 18 as well as the extra cable wires 212. When the arrangement 208 is used for identifying the wall outlet 202, it is associated with the outlet by being installed within the wall outlet 202, with the user line wires 18 as well as the extra cable wires 212 extending through the arrangement 208 to the socket of the outlet 202, or alternatively by being incorporated in an appendage to the outlet 202. When the arrangement 208 is utilized for identifying the drop cable 204, it is installed in an in-line electrical module, sometimes referred to as a "brick", 214 in line with the cable 204 and the wires corresponding to both the user line and the extra cable wires pass directly through the brick 214. When the arrangement 208 is installed within the peripheral user device 206, it is installed to communicate directly with the socket to which the input drop cable 204 is connected and the wires corresponding to both the user line and the extra cable wires pass through the arrangement 208.

As shown in FIG. 8, the identification device 208 includes a transceiver 216 and a memory 218. The transceiver 216 is illustratively a Neuron® chip having a burned in random identification number. (Alternatively, the identification number can be stored in the memory 218 or in a dedicated memory device.) The transceiver 216 is coupled to the extra cable wires 212. The memory 218 is illustratively an EPROM which contains "as built" information for the peripheral device with which it is associated. Such information would include, for example, the fact that the peripheral device is a drop cable, the length of the drop cable, the type of connectors at its ends, etc. In addition, user defined information such as the location and use of a line can be stored in the memory 218. The transceiver 216 is responsive to a defined interrogation signal on the extra cable wires 212 for providing on the extra cable wires the identification number (ID code) of its Neuron® chip and the information from the memory 218.

Referring now to FIG. 5, the cables containing the user lines 18 enter each line termination unit circuit card 20 at a respective one of the port connectors 160-1, ..., 160-8. The user lines 18 are connected through the port connectors 160 to the user line circuit paths including the cable drivers 110. The extra cable wires are connected through the port connectors 160 to the relay switches 162. The relay switches 162 are controlled by the relay drivers 114 and are arranged to selectively connect the transceiver 30, via the bus leads 164, to a selected group of the extra cable wires at a selected one of the port connectors 160.

When it is desired to identify all of the peripheral devices connected to a particular one of the user lines 18, the controller 26 sends an appropriate instruction to the transceiver 30 on the line termination unit circuit card associated with that user line. The transceiver 30 causes the appropriate one of the relay drivers 114 to actuate the appropriate one of the relay switches 162 to connect the extra cable wires associated with the selected user line through that one of the relay switches 162 to the bus 164. The microprocessor 102 of the controller 26 then provides an interrogation signal through the transceiver 28, over the bus 38, through the transceiver 30, over the bus 164, through the closed one of the relay switches 162, and over the extra cable wires 212 to all of the transceivers 216 of all of the peripheral devices connected to the selected user line. All of the transceivers 216 then attempt to respond to the interrogation signal, but the microprocessor 102, in accordance with a known polling algorithm, selects one of the transceivers 216 and instructs the other transceivers 216 not to respond any further. After the selected transceiver 216 has responded with its ID code and the information stored in the associated memory 218, the microprocessor 102 instructs that transceiver to ignore all further interrogation signals. The interrogation signal is then applied again and the remaining transceivers 216 attempt to respond. This process continues until all of the transceivers 216 associated with the selected user line have responded and no more responses are received after an interrogation signal. The transceivers 216 are then instructed to respond to the next interrogation signal. In this manner, the microprocessor 102 identifies all of the peripheral devices connected to a selected one of the user lines 18. By polling all of the user lines 18, a map of all of the assets connected to the cable management system can be generated. Such polling can take place on a regular basis and the results transmitted to the management station 14 so that the system operator can account for all of the peripheral devices connected to the cable management system.

Accordingly, there has been disclosed an improved cable management system wherein peripheral devices connected to the user lines can be identified. While an illustrative embodiment of the present invention has been disclosed herein, it is understood that various modifications and adaptations to the disclosed embodiment will be apparent to those of ordinary skill in the art. Thus, while the disclosed embodiment is directed to an implementation of this invention for the user lines of a cable management system, the principles of this invention are also applicable to the service lines. Therefore, it is intended that this invention be limited only by the scope of the appended claims and equivalents thereto.

The details of the LTU cards schematics for a fixed Ethernet version and the STU cards schematics for a fixed Ethernet version and the Controller A card schematics and a 15 Volt power supply schematics are attached in microfiche Appendix I. The details for a universal version, i.e. non-Ethernet version, are in additional drawings and a bill of materials, which are attached in microfiche Appendix II.

What is claimed is:

1. In a cable management system interposed between a plurality of service lines (16) and a plurality of user lines

(18) and including a plurality of service termination unit circuit cards (22) each connectable to a first predetermined number of respective ones of said plurality of service lines, a plurality of line termination unit circuit cards (20) each connectable to a second predetermined number of respective ones of said plurality of user lines, connecting means (24, 36, 37) for connecting each of said plurality of service termination unit circuit cards to all of said plurality of line termination unit circuit cards, each of said line termination unit circuit cards including a respective port connector (160) for each of the user lines connected to that line termination unit circuit card and a respective user line circuit path (110) between each of said port connectors and said connecting means, each of said plurality of service termination unit circuit cards including switching means (126) for selectively connecting one of the plurality of service lines connected to that service termination unit circuit card to one of said plurality of user line circuit paths, each of said user lines consisting of a first plurality of wires within a cable (210) having said first plurality of wires and a second plurality of wires (212), and each of said port connectors being connected to said first and second pluralities of wires of the cable carrying the respective user line associated with said each port connector, an arrangement for identifying a peripheral device connected to said each user line via said cable comprising:

an identification device (208) associated with said peripheral device, said identification device including:

ID code means (216) for providing a unique identification code for said identification device;

coupling means (216) for coupling said ID code means to said second plurality of wires of said cable; and control means (216) responsive to an interrogation signal on said second plurality of wires of said cable for causing said coupling means to transmit said unique identification code from said ID code means over said second plurality of wires of said cable; and interrogation means (102,28,30) coupled to said second plurality of wires of said cable through said each port connector for placing said interrogation signal on said second plurality of wires of said cable and thereafter receiving said unique identification code from said identification device.

2. The arrangement according to claim 1 wherein said identification device further includes memory means (218) coupled to said coupling means for storing predetermined characteristic information for said peripheral device, and said control means is further responsive to said interrogation signal for causing said coupling means to transmit said predetermined characteristic information from said memory means over said second plurality of wires of said cable.

3. The arrangement according to claim 1 wherein said identification device further includes memory means (218) coupled to said coupling means for storing predetermined user defined information for said peripheral device, and said control means is further responsive to said interrogation signal for causing said coupling means to transmit said predetermined user defined information from said memory means over said second plurality of wires of said cable.

4. The arrangement according to claim 1 wherein said interrogation means includes:

bus means (164) on each of said line termination unit circuit cards; and controllable switch means (162) on each of said line termination unit circuit cards coupled between the bus means on said each card and the second plurality of wires at each of the port connectors on said each card.

5. The arrangement according to claim 4 wherein said interrogation means includes means for polling all of the identification devices associated with all of the peripheral devices connected to all of the user lines.

6. The arrangement according to claim 1 wherein said peripheral device is a wall outlet (202) having a socket for providing a removable connection to said cable and said identification device is mounted within the housing of said wall outlet between said socket and the connection to the user line.

7. The arrangement according to claim 1 wherein said peripheral device is a wall outlet (202) and said identification device is incorporated in an appendage to said wall outlet.

8. The arrangement according to claim 1 wherein said peripheral device is a drop cable (204) and said identification device is mounted within an in-line electrical module (214) connected to said drop cable.

9. The arrangement according to claim 1 wherein said peripheral device is a peripheral user device (206) having a socket for receiving an input drop cable (204) and said identification device is mounted within the housing of said peripheral user device and is connected to said socket.

* * * * *